United States Patent
Krueger

[15] 3,654,904
[45] Apr. 11, 1972

[54] BIRD FEEDER

[72] Inventor: Clement E. Krueger, P.O. Box 4144 Walnut Creek, Calif. 94596

[22] Filed: Apr. 3, 1970

[21] Appl. No.: 25,510

[52] U.S. Cl. ............................................................119/18
[51] Int. Cl. .........................................................A01k 31/00
[58] Field of Search .................................119/18, 17, 51, 24

[56] References Cited

UNITED STATES PATENTS

| | | |
|---|---|---|
| 2,190,119 | 2/1940 | Hoefler..................................119/18 X |
| 1,227,471 | 5/1917 | Mack......................................119/18 |
| 2,031,874 | 2/1936 | Butler et al. ..........................119/18 |

Primary Examiner—Hugh R. Chamblee
Attorney—Clarence A. O'Brien and Harvey B. Jacobson

[57] ABSTRACT

A housing has an opening formed in the forward portion thereof to allow insertion and removal of a tray. A feeding cup is attached to the tray and serves as a receptacle for bird feed. The housing serves as a shield against outward scattering of feed and the tray prevents feed from being dropped downwardly into a surrounding cage. Feed is easily replenished and the tray is conveniently cleaned by removing the tray from the housing.

3 Claims, 4 Drawing Figures

PATENTED APR 11 1972

Clement E. Krueger
INVENTOR.

BY Clarence A. O'Brien
and Harvey B. Jacobson
Attorneys

Clement E. Krueger
INVENTOR.

BY Clarence A. O'Brien
and Harvey B. Jacobson
Attorneys

BIRD FEEDER

The present invention relates to a bird feeder.

During the present time, conventional bird feeders include a simple cup generally attached to the wires of the surrounding cage. Feeders in use provide little or no shielding so that feed and chaff dropped by a bird is scattered outside the cage and onto the floor of the cage. As will be appreciated, this is a nuisance and inconvenience to the owner who must continually clean the mess generated by the bird.

The present feeder includes a shielding housing which prevents scattering of feed and chaff. Further, the feed cup is mounted on a removable tray which collects the scattered feed and chaff so that this material is not scattered outwardly of the cage or on the cage floor. By virtue of the removable tray included in the present invention, it is a simple matter to clean the mess produced by a bird, and to replenish the feed supply. A further advantage of the invention resides in the fact that the shielding housing provides more feeding area than conventional feeders and does not restrict birds to a limited space.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
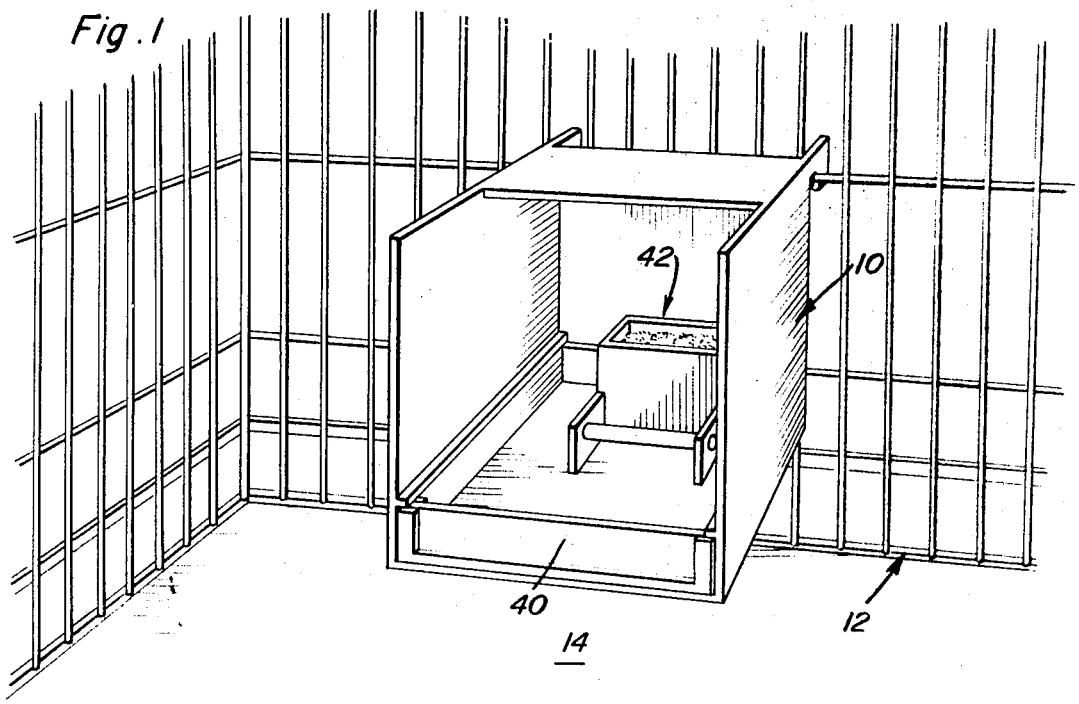
FIG. 1 is a perspective view illustrating the disposition of the present feeder in a cage.
Figure 2:
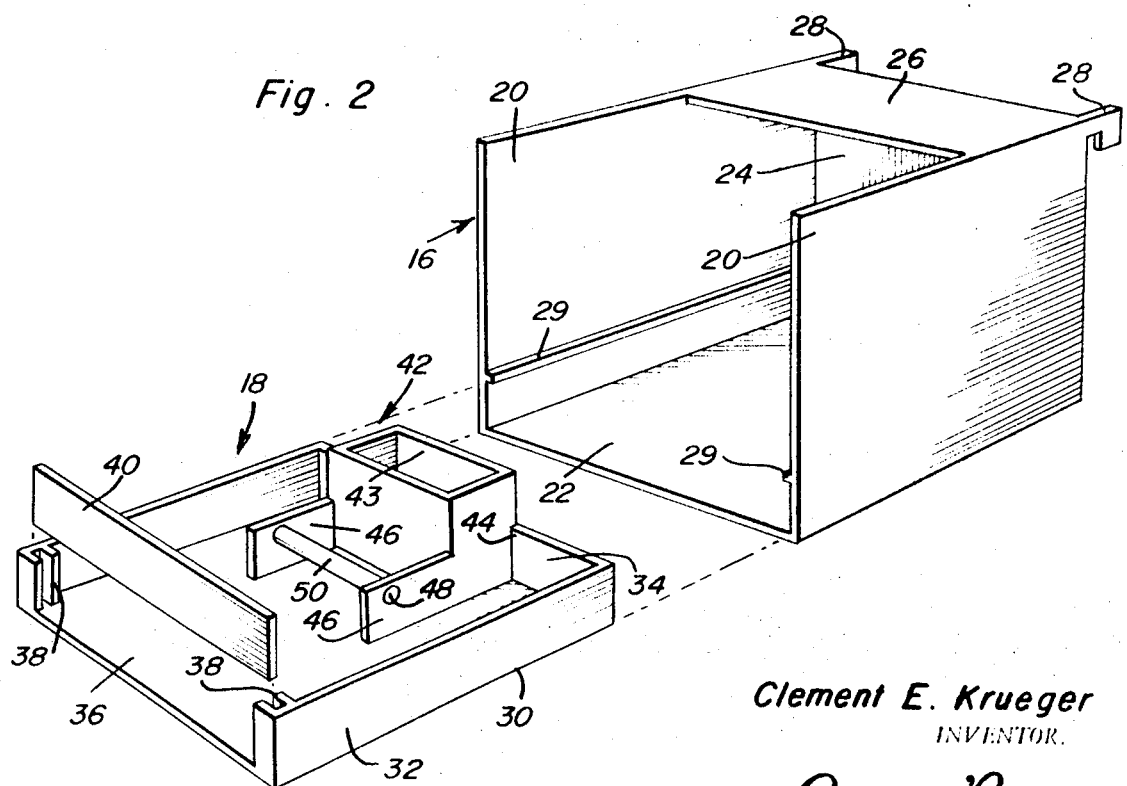
FIG. 2 is an exploded view showing the components of the feeder.
Figure 3:
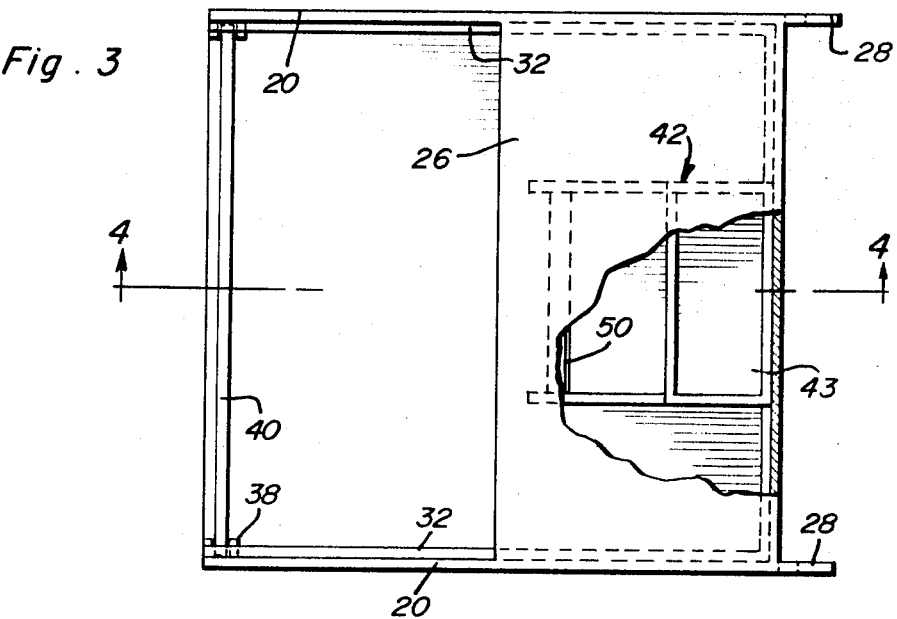
FIG. 3 is a partially cut-away top plan view of the feeder.
Figure 4:
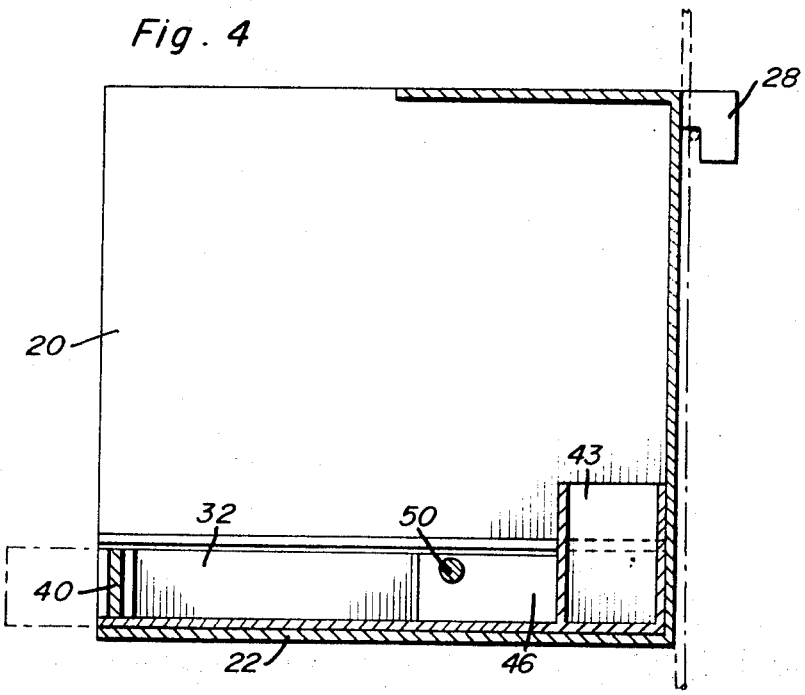
FIG. 4 is a vertical sectional view taken along a plane passing through section line 4—4 of FIG. 3.

Referring to the figures, and more particularly FIGS. 1 and 2, the present feeder is generally indicated by reference numeral 10 and is seen to be attached to the wall 12 of a surrounding cage and in an elevated position with respect to the cage floor 14.

The feeder is seen to include a shielding housing 16 which admits a sliding feeding tray 18. The housing has side walls 20 articulating to a base or bottom wall 22 on which the feeding tray 18 rests when inserted in the housing. A rear wall 24 of the housing articulates to an upper rearward wall section 26. A large opening characterizes the upper forward portion of the upper wall 26, this opening allowing a bird freedom of movement while feeding. Integrally connected downwardly opening notched extensions or hook elements 28 extend rearwardly from the rear edge of side walls 20 behind the rear wall 24 thereby allowing the feeder to be attached to a horizontal bar or wire of the surrounding cage 12. Elongated rail elements 29 are attached to the bottom portion of the interior confronting surfaces of side walls 20. These rail elements engage the feeding tray 18 and serve as guides for the tray during removal and insertion thereof.

Considering the structure of feed tray 18, as shown in FIG. 2, the tray includes a base 30 bounded by side walls 32 and a rear wall 34. A removable partition 40 serves as a front wall for the tray and upon its removal, and entrance 36 may be gained to the tray for the purpose of effecting simple cleaning.

Vertical track elements 38 extend in confronting relation from the side walls 32 and serve as guides for the removable partition 40.

A feeding cup 42 is positioned along the rear wall 34 of the tray. More particularly, the feeding cup includes a receptacle 43 for receiving feed. The rear wall of the receptacle 43 is notched as indicated by 44 so that the cup is positioned in vertical flush relation with the rear wall 34 of the tray. Forwardly directed flanges 56 are coextensive with the side walls of the receptacle 43 and serve to mount a removable perch 50 that is transversely disposed within aligned apertures in the flanges 46.

Although the present invention has been described in terms of a manually refillable feeder, this unit can also be used as an automatic feeder by attaching a hopper outside cage 12. Typically, the hopper would include a slotted tube that extends through the wires of the cage. The slotted tube would extend into an opening formed in the housing and then terminate in communication with the receptacle of the feeder cup. The hopper inlet would be easily accessible from outside the cage so that it could be filled without being removed from the cage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bird feeder for use in conjunction with a bird cage including side-by-side vertical bars crossed by a horizontal bar, said feeder comprising a housing having upstanding opposite side walls interconnected by means of a generally horizontal bottom wall and an upstanding rear wall as well as at least a partial top wall extending between the upper marginal edge portions of said side walls and projecting forwardly from the upper marginal edge portion of said rear wall, said housing including an open front, a feeding and droppings tray removably supported within the lower portion of said housing for horizontal removal through the open front of the housing, the rear portion of said tray including means defining an upwardly opening feed cup and horizontal perch means supported from said tray above the bottom thereof adjacent and forward of said cup, said perch being disposed rearward of the front half of said tray, said top and side walls extending forwardly passed said perch, the rear portions of the upper marginal edges of said side walls including downwardly opening notched extensions projecting rearwardly from the rear wall, said notched extensions being adapted to be hooked over longitudinally spacer portions of said horizontal bar with the rear surface of said rear wall abutting said vertical bars.

2. The structure of claim 1 wherein the tray has marginal walls including a rear wall, side walls, and a removable partition serving as a front wall whereby removal of the partition facilitates tray cleaning.

3. The structure of claim 1 wherein the cup projects above the top of the tray and includes an offset rear wall to permit flush mounting of this wall with respect to the rear wall of the tray.

* * * * *